Oct. 17, 1961 W. A. WHITNACK 3,004,655
DETACHABLE RECEPTACLE FOR A MOTOR VEHICLE
Filed June 6, 1957 2 Sheets-Sheet 1
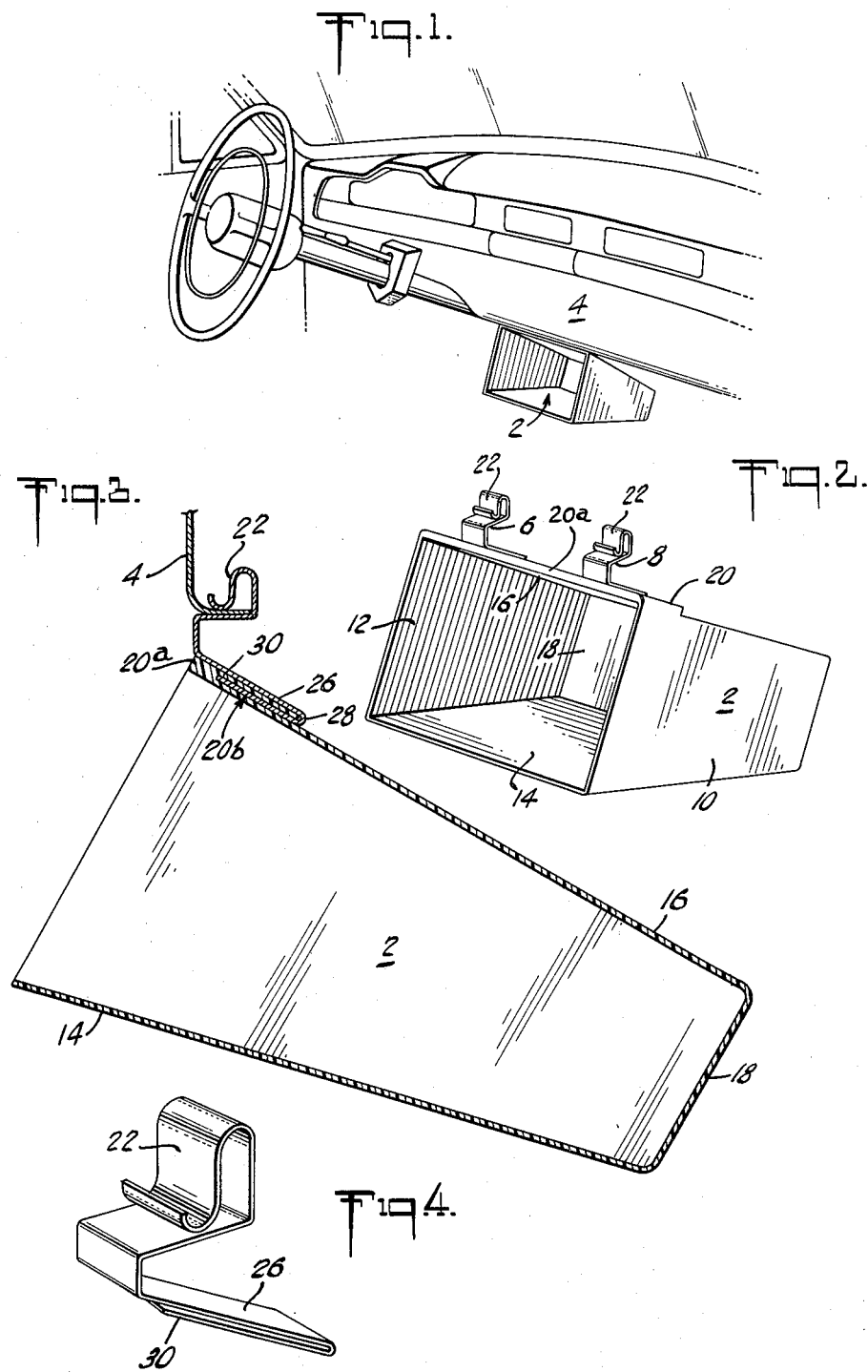

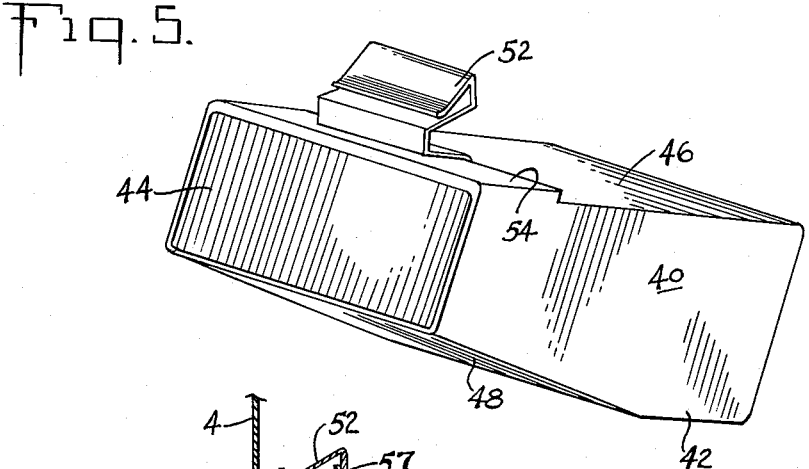
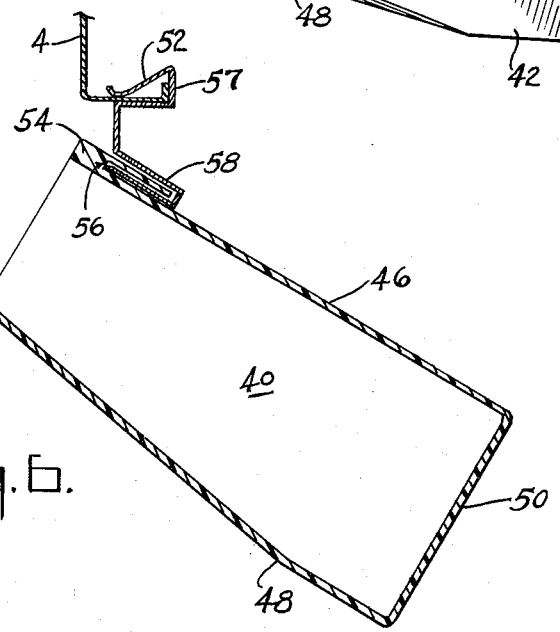
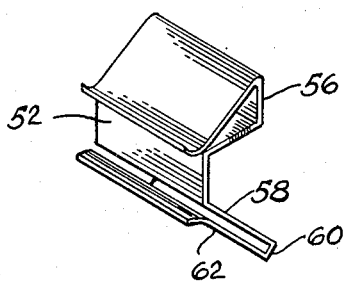

United States Patent Office 3,004,655
Patented Oct. 17, 1961

3,004,655
DETACHABLE RECEPTACLE FOR A MOTOR VEHICLE
Walter A. Whitnack, Murray Hill, N.J., assignor to Thomas H. Whaley, Mount Vernon, N. Y.
Filed June 6, 1957, Ser. No. 664,016
3 Claims. (Cl. 206—19.5)

This invention relates to a detachable receptacle for a motor vehicle. More particularly, it relates to a receptacle particularly adapted for the disposal of trash. In one of its specific embodiments it relates to a readily accessible receptacle for trash or litter adapted for detachable mounting to the instrument panel of automotive vehicles.

The disposal of trash or litter from motor vehicles is a growing problem. Increased automotive travel has encouraged the carrying of packaged and wrapped foods or roadside purchases of wrapped edibles. Paper tissues, napkins and other throw-away articles are also usually taken in automobiles on long and short trips. By examining the roadsides of the nation's highways, ample evidence is seen as to the method generally employed in discarding trash. A recently published estimate of 50 million dollars annually as the expense to the various states to clean up litter points up the magnitude of this problem. Thus, it is seen that there is a great need for satisfactory disposal means for motor vehicles.

It is an object of this invention to provide a simple and inexpensively manufactured disposal receptacle attachment for easy detachable mounting to the instrument panel of a motor vehicle. Another object of this invention is to provide a receptacle for an automobile which is readily accessible to the driver. A further object of this invention is to provide a vehicle panel-mounted receptacle which may be easily detached, emptied, and remounted.

These and other objects are realized in accordance with the present invention which broadly comprises in combination at least one attaching element consisting essentially of vehicle instrument panel clamping means and receptacle engaging means adapted to hang below said panel to which said attaching element is clamped, a receptacle comprising a walled enclosure having a closed back and open front for receiving items, and means on an outer side of said walled enclosure to receive said receptacle engaging means. In a preferred embodiment of the invention, the attaching element consists of a resilient clip adapted to engage and firmly hold an instrument panel, and a hook member having a bend and a free end. The free end of said hook extends in a substantially straight line upwardly from the bend in the direction in which said instrument panel is facing whereby said receptacle when engaged with said hook will assume a tilted position having its back end substantially lower than its open end.

The walled enclosure, in one embodiment of the invention, consists of two side walls, top and bottom walls, a closed back and an open front. In one embodiment, the side walls are wider at the front end than at the back of said receptacle. This arrangement provides a wide and easily accessible receptacle opening.

In another embodiment of the invention, the side walls are wider at the back than at the front end of the receptacle. This arrangement provides greater space in the container to receive a larger amount of trash.

The open end of the receptacle preferably is provided with a rim portion substantially thicker than the remainder of the receptacle adapted to engage the attaching element to hold the receptacle in position in the vehicle. In preferred embodiments illustrated in the drawings, the top wall of the receptacle has a thicker portion, or rectangular slab, preferably integral therewith, which is slotted along the direction from back to front of the receptacle. This slot is adapted to accommodate the straight free end of the hook member of said attaching element.

The invention will be better understood by referring to the following specification and attached drawings in which FIG. 1 is a view of a motor vehicle instrument panel area with a receptacle of the invention in attached position; FIG. 2 is a perspective view of a receptacle with one form of attaching element; FIG. 3 is a side sectional view of the receptacle shown in FIG. 2 illustrating said attaching element clamped to an instrument panel; FIG. 4 is a perspective view of the attaching element shown in FIGS. 2 and 3; FIG. 5 is a perspective view of another embodiment of the invention; FIG. 6 is a side sectional view of the embodiment shown in FIG. 5 illustrating another form of attaching element clamped to an instrument panel; and FIG. 7 is a perspective view of the attaching element shown in FIGS. 5 and 6.

In FIGS. 1 to 4, one embodiment of the invention is shown. The receptacle, generally designated by the numeral 2, is shown mounted under the instrument panel 4 in FIG. 1. It is apparent that the receptacle is easily accessible to the driver and passenger in the front of the vehicle.

FIGS. 2 and 3 show the receptacle 2 with attaching elements 6 and 8 engaged therewith. The receptacle includes sides 10 and 12, bottom 14, top 16, and back 18. Sides 10 and 12 are wider near the open end of the receptacle and narrower near the back end thereof. As can be seen, this provides a large opening through which articles of trash may be deposited in the receptacle. This also makes the receptacle easily accessible to the driver with minimum effort and very little diversion of attention from driving.

The outer side of the top wall 16 of the receptacle 2 has mounting means 20 provided thereon to engage the attaching elements 6 and 8.

An attaching element, as seen in FIGS. 3 and 4, includes a panel clamping means 22 which in the preferred embodiment is a resilient clip designed to firmly engage the edge of the flange 24 of the instrument panel 4. Most automobiles presently have instrument panels employing flange portions of the type shown. Directly connected to clip 22 and integral therewith is a hook member 26 having bend 28, and free end 30 extending in a substantially straight line to bend 28. This straight section of the hook along the free end to the bend is designed to slant downwardly when the clip 22 is attached to flange 24. The free end of hook 26 engages the mounting means 20 on receptacle 2.

In a preferred embodiment, the mounting means 20 consists of a flat slab 20a situated across top wall 16. This slab 20a is conveniently molded integrally with the receptacle 2. A slot 20b is provided in the slab 20a to accommodate each hook member 26 used to suspend or attach the receptacle to the instrument panel. Slot 20b begins at the lower edge of slab 20a and proceeds upwardly parallel to wall 16 toward the open end of receptacle 2. It is not necessary that the slot extend completely through the slab 20a so long as it is deep enough to securely engage the free end of hook 26.

It can be seen that receptacle 2 in the preferred form is suspended so that bottom wall 14 slants downwardly toward the back 18 thus preventing articles from sliding out. This slanting position results from the position of the hook wherein the free end 30 of hook 26 is higher than the bend portion 28. When hook 26 is engaged with mounting means 20, the slant of the free end 30 on hook 26 is imparted to the receptacle 2.

FIG. 5 is a perspective view of a modification of the invention. The receptacle, generally designated by the numeral 40, comprises side walls 42 and 44, top wall 46, bottom wall 48 and back wall 50. Side walls 42 and 44 are wider toward the back end than at the open end of the receptacle 40. As can be seen, this provides extra space within the receptacle to retain trash or the like.

In FIG. 6, a clear view of the attaching element, broadly designated as 52, clamped to the instrument panel 4 and engaging receptacle 40 is shown. Slab 54 contains slotted portion 56 which is similar but wider than the slotted portion 20b shown in FIG. 3.

FIG. 7 is a perspective view of an attaching element 52 as seen in FIGS. 5 and 6. In this form, element 52 is wider than the corresponding elements of FIGS. 2 to 4, and is designed for use singly to attach the receptacle to the instrument panel. The clamping portion 57 of the attaching element 52 securely engages the flanged bottom edge of panel 4. The hook 58 with bend 60 and free end 62 engages the receptacle 40 by insertion of free end 62 into slot 56 which is designed to accommodate it.

The receptacle with mounting means is economically molded from plastic material, however, wood, metal, or heavy paper can also be used. The attaching elements are preferably manufactured from resilient metal strips but these can also be made of plastic or other suitable materials.

Cover means, not illustrated, may be provided over the open end, or receiving end, of the receptacle.

Obviously, many modifications and variations of the invention, as hereinbefore set forth, may be made without departing from the spirit and scope thereof, and therefore only such limitations should be imposed as are indicated in the appended claims.

I claim:

1. A receptacle adapted for mounting on the forwardly extending flange of an automobile instrument panel comprising in combination a container having two side walls, top and bottom walls and a back wall forming a walled enclosure open at its front, each of said top and bottom walls being of greater area than said side walls, a pocket on the outside of said top wall adjacent the open end of said container closed at both sides and at its bottom and opening toward the closed end of said container, means for releasably attaching said container to said automobile instrument panel comprising a U-shaped clamp releasably engaging said flange, a U-shaped hook attached at one end to one end of said clamp such that the free side of said hook is below said attached end and forms an acute angle with said side of said clamp with the free end of said hook higher than its bend and pointing in the direction of the open end of said container, said pocket portion of said container being adapted to substantially completely cover said free side of said hook removably holding said container in position below said instrument panel at an angle extending downward from said open front end toward said back wall.

2. A receptacle as defined in claim 1 wherein said pocket on the outside of said top wall is formed in a rectangular slab extending from side to side across the top wall of said container imparting rigidity to said container.

3. A receptacle as defined in claim 1 wherein the area of said back wall is greater than the area of the opening at the front of said receptacle.

References Cited in the file of this patent

UNITED STATES PATENTS

| | | |
|---|---|---|
| D. 180,199 | Perreault | Apr. 30, 1957 |
| 1,564,989 | Weisberger | Dec. 8, 1925 |
| 1,596,498 | Macchiavello | Aug. 17, 1926 |
| 1,848,005 | Eudreson | Mar. 1, 1932 |
| 1,958,934 | Williams | May 15, 1934 |
| 2,243,433 | McIntyre | May 27, 1941 |
| 2,278,691 | Cotter | Apr. 7, 1942 |
| 2,580,985 | Wooden | Jan. 1, 1952 |
| 2,694,825 | Touchette et al. | Nov. 23, 1954 |
| 2,735,597 | Treleven | Feb. 21, 1956 |